July 4, 1944.   B. A. ANDALIKIEWICZ ET AL   2,352,880
ARTICLE TESTING MACHINE
Filed Jan. 28, 1942   2 Sheets-Sheet 1

INVENTORS.
Boley A. Andalikiewicz
Drexel T. Carlson
BY
ATTORNEY.

July 4, 1944.   B. A. ANDALIKIEWICZ ET AL   2,352,880
ARTICLE TESTING MACHINE
Filed Jan. 28, 1942     2 Sheets-Sheet 2
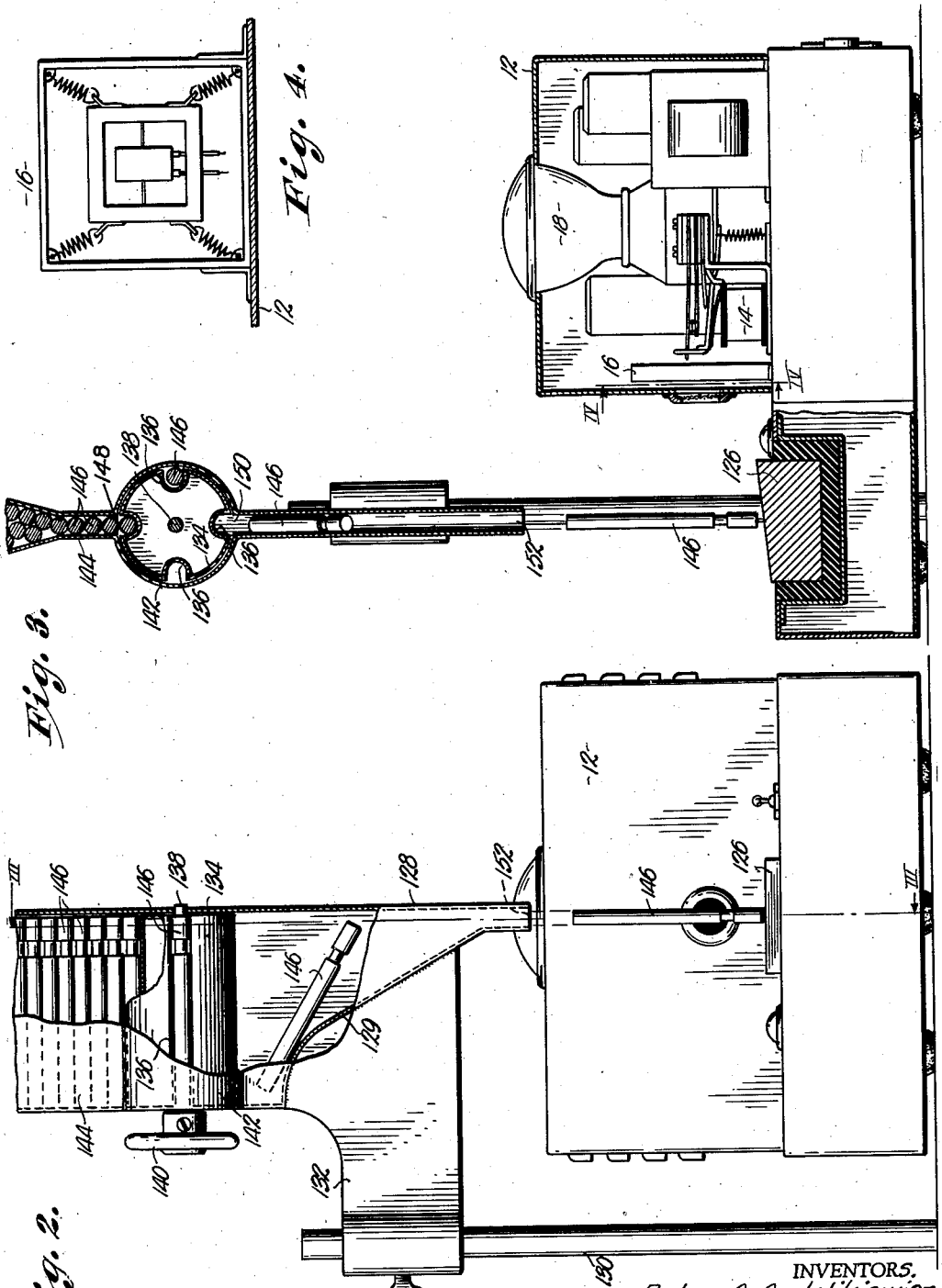
INVENTORS.
Boley A. Andalikiewicz
Orexel T. Carlson
BY 
ATTORNEY.

Patented July 4, 1944

2,352,880

UNITED STATES PATENT OFFICE 2,352,880

ARTICLE TESTING MACHINE

Boley A. Andalikiewicz and Drexel T. Carlson, Kansas City, Mo., assignors to C. Earl Hovey, trustee, Kansas City, Mo.

Application January 28, 1942, Serial No. 428,464

5 Claims. (Cl. 73—51)

The instant invention relates to apparatus for the testing of various kinds of materials and is a continuation in part of the application for Electrical discriminator for testing material, Serial No. 417,966, filed November 5, 1941.

The principal aim of the instant invention is the provision of means for causing sounds of predetermined amplitude to be introduced into the electrical discriminator.

The said electrical discriminator is so designed that the introduction therein of electrical impulses of predetermined frequency cause the discriminator to oscillate at the said frequency, but the said discriminator possesses the characteristics of not being responsive to sounds of any other than the predetermined frequency.

The basic manner of operation of an electrical tester of the type described is as follows: The article to be tested, generally metal, is dropped upon an anvil. The impact of the article upon the anvil causes vibrations to be set up in the former. The frequency of these vibrations is determined by the structural properties of the article being tested. Thus, it can be understood that articles having uniform structural properties will produce sounds of the same frequency when said articles are dropped upon the surface of the anvil. If the structural properties are dissimilar, sounds of different frequencies will be produced; and likewise, if a flaw is present in one of the articles, sounds of dissimilar frequencies will be produced by the articles.

A means for determining the properties of an article in the manner as aforesaid is shown and discussed at length in the previous application entitled "Electrical discriminator for testing material."

This device constitutes primarily a phase shift oscillator having a phase shifting net work in the feed back circuit thereof, the characteristics of said phase shifting net work determining the frequency at which oscillation will take place. The presence of oscillation, or the lack of it, choice being determined by the manner in which the device is operated, may be observed in any conventional manner. The ordinary mode of operation provides that the oscillator shall be made to oscillate when the electrical energy of proper frequency is introduced into the circuit by means of a crystal type microphone.

It has been found with respect to the operation of an electrical discriminator for testing material as aforesaid, that the varying amplitude of the sounds introduced into the discriminator result in slightly variable operational characteristics. This results because the peaks of the electrical impulses generated by the microphone are increased in amplitude and this necessarily causes the strength of the unwanted amplitudes to be increased to the point where the oscillator may be induced to oscillate on a spurious frequency. The oscillation produced at an unwanted or spurious frequency results in a lowering of the effectiveness of the machine's ability to discriminate between articles having different structural characteristics.

Where a nicety of discrimination is to be obtained, it is therefore highly desirable to have some means of limiting the amplitude of the sounds reaching the electrical discriminator. The instant invention provides such means in two forms, the first of which is an electrical limiter so constructed as to introduce into the input of the electrical discriminator sounds within a limited amplitude range regardless of the amplitude of the sounds introduced into the limiter. Another modification of the invention shown herein is a means of dropping an article to be tested from a predetermined height and position in such manner that a sound of constant amplitude is produced.

Figure 1 schematically illustrates a wiring diagram of an arrangement embodying a limiter and applicant's entire electrical discriminator for testing material. The limiter and pre-amplifier thereof, being set off by broken lines.

Fig. 2 is a side elevational view of the dropping device as associated when in operative relationship with the commercial form of apparatus in which applicant's electrical discriminator is employed.

Fig. 3 is a front cross-sectional view of the dropping device taken on line III—III of Fig. 2, showing the manner in which it is associated with the commercial form of the electrical discriminator.

Fig. 4 is a cross-sectional view of the commercial form of the apparatus taken along line IV—IV of Fig. 3.

Figure 1:
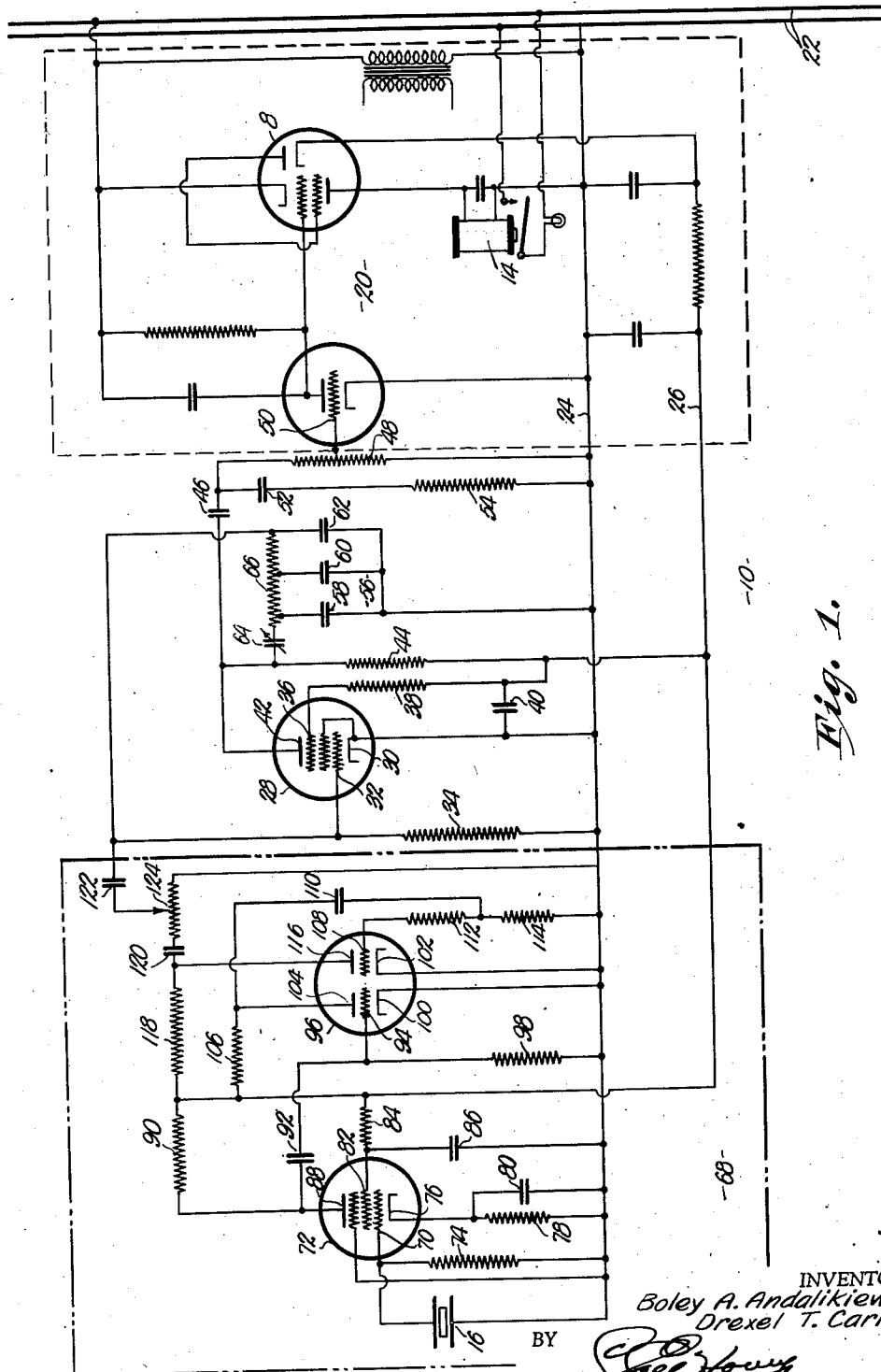

The commercial form of applicant's invention embodies a circuit 10 which is housed within a cabinet 12. This circuit 10 is arranged to operate a relay 14 when the proper sound is transmitted by the microphone 16. This relay 14 in turn controls the operation of light 18. This relay may be incorporated in the circuit in any conventional manner and is shown at 14 in the plate circuit of the last amplifying tube 8 of c'rcuit 10.

Applicant's circuit incorporates a conventional power supply and amplifier 20. This power supply is fed by means of lines 22 which supply current thereto. Positive and negative connection for the operation of applicant's oscillator and limiter are obtained by means of wires 26 and 24 respectively.

The discriminator circuit has therein a vacuum tube 28 which is preferably of the pentode variety but may be any other type of tube having suitable characteristics. Cathode 30 of tube 28 is connected to negative wire 24. Grid 32 is by-passed by means of resistor 34 which is conventional and may be of any suitable value depending upon the characteristics of the tube employed.

Screen grid 36 is connected to wire 26 through isolating resistance 38, said resistance 38 being by-passed by condenser 40. Plate 42 is supplied current through plate resistor 44 which is connected to the positive lead 26. The out-put of the plate circuit is coupled by means of condenser 46 and variable resistance 48 into first grid 50 of the conventional amplifier 20. The input circuit of the amplifier has a stabilizing and filter circuit comprising condenser 52 and resistance 54. It is to be understood that the aforementioned parts of the circuit are conventional and the values of the components employed therein are therefore not specified since the same would very, depending upon the characteristics of the tubes employed. Mention is made of these components merely to facilitate the understanding of the manner in which the circuit operates.

The plate circuit of tube 28 has incorporated therewith a phase shifting net work 56. This net work is shown as a 3 mesh circuit but may be a 4 mesh or other design of phase shifting net work. This net work following tube 28 produces a phase shift of 180° in the frequency range wherein the shunting capacitances 58, 60 and 62 may be neglected. The phase shifting net work shown produces an out-put voltage such as will be in phase with the input voltage of the tube with which it is associated. Condenser 64 is variable and by varying the capacity of the same the amount of energy coupled into the net work may be increased or decreased depending upon the manner of operation.

Resistance 66 consists of a number of separate components of such value as will produce the characteristics sought in the phase shifting net work. Thus in operation currents in the plate circuit will be introduced into the phase shifting net work 56 which constitutes a portion of the feed back circuit. The amplitude of this current may be regulated by means of condenser 64. This current passes through phase shifting net work 56 and is then coupled to the grid 32 of tube 28. Since this current flowing from the net work is in phase with the current on the grid, there will be a tendency to produce oscillation providing the strength of the feed back is at a sufficiently high level.

It is thus seen that if energy of suitable frequency characteristics is introduced into the circuit of tube 28, the same will be amplified in the circuit and a portion of energy coupled back into the input thereof to produce oscillation.

Condenser 64 is adjusted so that the circuit of tube 28 is not self oscillating but must be supplied with energy of a specified frequency from an external source before the circuit commences oscillation.

In the commercial form of the device each unit of resistance 66 is approximately the value of 50,000 ohms, and the value of the condensers 58, 60 and 62 are approximately .0005 mfd. Variable condenser 64 has a range of .0003 to .0005 mfd.

Applicant preferably employs a microphone of the piezo-electric type, since it has a minimum of parts, may be easily incorporated into the circuit, and does not require the use of transformers or similar apparatus.

It is further to be understood that the manner in which the circuit functions with reference to starting and stopping the oscillation thereof may be easily reversed, that is a microphone and associated circuits might be employed in such manner that the current produced thereby could be coupled into the feed back circuit to buck the same and thereby cause the circuit to cease oscillating when the microphone is energized by a suitable frequency. This might be accomplished in a number of ways of which one would be the use of a phase shift net work in connection with a microphone and associated circuits whereby the current produced by the microphone and circuits is used to buck the current flowing the feed back circuit. By this method the oscillator could be made to cease oscillating when a sound wave of suitable frequency is impressed upon the microphone.

A limiter circuit 68 incorporating therein a preamplifier is introduced before the input of tube 28. This circuit comprises a microphone 16 which is preferably of the piezo-electric type and is coupled directly into the grid 70 of tube 72. This grid has a biasing resistor 74 connected to negative wire 24. Cathode 76 is connected to wire 24 through resistor 78 which is by-passed by condenser 80. Screen grid 82 is connected through isolating resister 84 to positive lead 26, said resistor being by-passed by condenser 86. Plate 88 is connected to positive lead 26 through resistance 90 and the out-put of the plate circuit of tube 72 is conducted by means of condenser 92 to the grid 94 of tube 96, said grid having biasing resistor 98 connected to wire 24. Cathodes 100 and 102 are connected directly to negative wire 24. Plate 104 is connected through resistance 106 to positive lead 26 and the out-put of this portion of the plate circuit is coupled into the other grid 108 of duo-triode tube 96 by means of condenser 110 and resistances 112 and 114. This other grid 108 controls the current flow through the circuit of the second triode in the envelope of tube 96. This second triode circuit is designed to function as a limiter and the plate 116 thereof is connected to positive lead 26 through resistance 118, and the out-put of the circuit is introduced into the grid circuit of tube 28 through condensers 120, 122 and variable resistance 124.

The type of limiter shown, which comprises the circuit associated with the second triode in the envelope of tube 96, consists of a tube biased to cut off, where the impulses introduced into the grid circuit cause the grid to become alternately positive and negative.

The resistors 114 and 112 are connected to the cathode so that in the absence of signal the grid is at zero bias. When a positive signal is applied to the grid through condenser 110 grid current flows into this condenser until the grid returns to cathode potential. Equilibrium is established very rapidly because even the small positive potential causes a large current to flow to the grid. This condition having once been reached any signal more negative than this positive peak stops the flow of grid current and the condenser 110 can only lose its charge through the resistor 114.

The time-constant of the resistor condenser circuit is preferably made large and consequently the rate of discharge is low. Therefore, the grid tends to maintain itself at such a D. C. potential that zero bias corresponds to the maximum positive peaks of the signal.

It is desirable when operating a limiter of this type to do so at high input level and to use a fairly low plate voltage. In the case of the 6SC7 type tube employed in the instant device it was found that a plate potential of 125 volts was satisfactory. When using this potential on the plate a potential of one volt on the grid serve to bias the tube to the point of cut-off. Resistors 112 and 114 are of the value approximately 1 and 5 megohms respectively and condenser 110 is approximately .001 mfd. before introduction into the limiter portion of the circuit.

The out-put of the circuit has the variable resistor 124 therein which enables the user of the device to vary the level of the input introduced into the tube 28. This resistance is varied until the optimum amount of energy for coupling into the input circuit of the discriminator has been obtained. It is of course, desirable that there shall be no over-loading of the circuit and the adjustment hereinbefore mentioned enables the user to operate the discriminator circuit at maximum efficiency. When the limiter has been properly adjusted the action of the limiter including the amplifier will be such that the impulses generated by the crystal microphone will be amplified or attenuated as needs may be in order to introduce a relatively constant amount of energy into the input circuit of the discriminator.

Thus, when the article being tested is dropped from varying heights upon the anvil whereby to produce frequency vibrations of varying amplitude, this variance, due to the action of the limiter, will not effect the efficiency of the discriminator circuit.

A modification of a device embodying the general teachings of the invention is shown in Figs. 2, 3 and 4 wherein the circuit 10 is housed within a cabinet 12 which is positioned with the anvil 126 beneath a chute 128. This chute is supported by an adjustable stand 130 and arm 132. Immediately above chute 128 is positioned a rotatable cylinder 134 having slots 136 on the surface thereof. This cylinder is supported by shaft 138 which is provided with a knob 140. Cylinder 134 is enclosed by a circular wall 142 which is open at the point of connection with the chute and a magazine 144.

Articles 146 to be tested are stacked within the magazine so that they will find their way by gravity to opening 148 in the bottom of the said magazine. When knob 140 is turned, slots 136 will come into adjacent relationship with the opening 148 of magazine 144 permitting articles 146 to drop therein. Slots 142 are of such size that only one article is accommodated at a time. Rotation of the cylinder serves to rotate the article within the slot until the same is positioned adjacent opening 150 of chute 128. Chute 128 is of the approximate width of the article to be tested and has one wall 129 thereof inclined whereby to cause the said article 146 to fall in a vertical position towards lower opening 152 of chute 128. The article 146 will fall from chute opening 152 in a vertical position and strike the anvil 126 with a uniform force. Thus this device will insure that sounds of near constant amplitude are produced when the article being tested strikes the anvil.

Having thus described the invention, it is desired to be limited only by the scope of the appended claims.

We claim:

1. A machine for testing articles comprising an anvil, means for dropping the articles to be tested from a predetermined distance upon the anvil, and means responsive to the sound waves produced by the articles falling on the anvil when they are of a predetermined frequency to indicate such predetermined frequency as an index of the quality of the article.

2. A machine for testing articles comprising an anvil; means for directing the articles to be tested against the anvil with predetermined force; and means responsive to the sound waves produced by the articles directed against the anvil when they are of a predetermined frequency to indicate such predetermined frequency as an index of the quality of the article.

3. A machine for testing articles comprising an anvil; means including a guide chute and a stand holding the chute in position for dropping the articles to be tested from a predetermined point above the anvil; and means responsive to the sound waves produced by the articles falling on the anvil when they are of a predetermined frequency to indicate such predetermined frequency as an index of the quality of the article.

4. A machine for testing articles comprising an anvil upon which said articles are dropped; means for dropping the articles from a predetermined height and in a predetermined position to produce sounds of constant, predetermined amplitude; and means responsive to the sound waves produced by the articles falling on the anvil when they are of a predetermined frequency to indicate such predetermined frequency as an index of the quality of the article.

5. A machine for testing articles comprising an anvil; means for dropping the articles to be tested from a predetermined point above the anvil to create sound waves of a predetermined amplitude; and electrical detecting means responsive to the sound waves produced by the articles falling on the anvil when they are of a predetermined frequency for indicating such predetermined frequency as an index of the quality of the article, said detecting means including apparatus for generating an electrical current of a frequency corresponding to the vibrations of the article being tested, an electrically operated signal, and means for amplifying the current produced by the generating apparatus to actuate the signal.

BOLEY A. ANDALIKIEWICZ.
DREXEL T. CARLSON.